United States Patent
Stanton

(10) Patent No.: US 6,215,252 B1
(45) Date of Patent: Apr. 10, 2001

(54) METHOD AND APPARATUS FOR LAMP CONTROL

(75) Inventor: Douglas A. Stanton, Ossining, NY (US)

(73) Assignee: Philips Electronics North America Corporation, New York, NY (US)

(*) Notice: Subject to any disclaimer, the term of this patent is extended or adjusted under 35 U.S.C. 154(b) by 0 days.

(21) Appl. No.: 09/222,398

(22) Filed: Dec. 29, 1998

(51) Int. Cl.[7] .................................................. H05B 37/00
(52) U.S. Cl. ........................................... 315/224; 315/307
(58) Field of Search ..................................... 315/307, 324, 315/209 A, DIG. 5, 316, 224, 248

(56) References Cited

U.S. PATENT DOCUMENTS

| | | | |
|---|---|---|---|
| 5,065,072 | * 11/1991 | Albou et al. | 315/82 |
| 5,481,162 | 1/1996 | Boenigk et al. | 315/307 |
| 5,608,294 | 3/1997 | Derra et al. | 315/224 |
| 5,621,283 | * 4/1997 | Watson et al. | 315/362 |

FOREIGN PATENT DOCUMENTS

9535645A1    12/1985  (WO).

* cited by examiner

*Primary Examiner*—Don Wong
*Assistant Examiner*—Trinh Vo Dinh
(74) *Attorney, Agent, or Firm*—Bernard Franzblau

(57) ABSTRACT

A method for operating a lamp which includes the steps of providing an electric lamp having a pair of electrodes and an arc gap therebetween, providing a power supply for applying a voltage and current to the electric lamp, and providing a controller for sensing lamp parameters and configured to control a signal to be applied by the power supply to the electric lamp. The method further includes sensing the parameters of lamp operation. The sensed parameters are compared with desired lamp parameters. The controller commands the power supply to add a current pulse to a specific portion of the lamp current.

20 Claims, 2 Drawing Sheets

METHOD AND APPARATUS FOR LAMP CONTROL

BACKGROUND OF THE INVENTION

1. Technical Field

This invention relates generally to a method and apparatus for operating lamps, and more particularly to lamp controllers for preserving the performance characteristics of discharge lamps.

2. Description of the Related Art

High performance lighting systems are known in the art which incorporate discharge lamps designed for producing bright light from a small arc, and precision reflectors. Such systems include HID lamps that are short-arc high pressure mercury lamps in the form of a spherical or ovoid quartz bulb with a very short gap between the electrodes, typically between 1 mm and 1.4 mm. As a result, arc luminances rank among the highest of all lamp types. The chief asset of the short-arc mercury lamp is that it forms a near point source of light of very high luminance which makes it ideal for systems that employ a critically focused optical light collection system which usually depends on the maintenance of a very small arc length and accurate arc position for optimum performance. This makes it ideally suited for projection purposes, for example, a TV projection system or an LCD display apparatus.

These lamps are used in connection with precision reflectors and optics to produce a uniform collimated output with maximum light collection. The imaging properties of these optics are not critical, but rather their function is to collect substantially most of the energy emitted from the arc lamp and direct it into a beam with minimum etendue or geometric optical size. It is advantageous for the optical collection system to produce a light beam with as small an extent as possible to reduce power consumption and to reduce manufacturing costs associated with projection systems of smaller size and/or aperture.

There are several advantages associated with this system. As described above, it is desirable to produce light from a small arc gap because, inter alia, the smaller the arc gap the smaller the power that is needed to produce a given light output. Likewise, the optical collection systems described above incorporate reflectors that require a stable arc, and whose collection efficiency is severely reduced when the arc moves about significantly. For example, in some systems, a shift in the arc of only 1 mm can result in loss of up to 50% of collected light.

Inherent characteristics of the above lamp are variations in the arc gap between the electrodes. During AC operation of the lamp, the discharge arc is not stable because the origin of the discharge arcs jumps among random locations at the tip of the electrode. Likewise, tungsten material (W) from the electrode itself evaporates during lamp operation and redeposits on the electrode tip.

It is known in the art to provide arc lamp power supplies which are configured to produce a constant power for the arc lamp. When such supplies are employed, power within the arc is measured, and the current is adjusted such that a desired power is achieved and maintained. Consequently, if the arc burns back the electrodes to produce a longer arc, or the arc for any reason becomes shorter, appropriate voltage and current changes are invoked to maintain the preset power desired. However, these power supplies have no mechanism for sensing or control of the lamp arc gap. As a result, the arc gap is left to find its own natural dimensional envelope while power is maintained. Thus the arc gap may fluctuate or reach unacceptable dimensions.

Several approaches have been tried to improve the consistency and reliability of lamp operation. For example, U.S. Pat. No. 5,608,294 to Derra et al, which is hereby incorporated by reference, discloses a method of operating a lamp to reduce flicker arising from the above-described random jumping of the discharge arc. The method disclosed therein comprises the addition of a stabilization current pulse which is generated in a predetermined fraction of the half periods of the AC square wave lamp current. The stabilization current pulse has the same polarity as the lamp current and is superimposed on the lamp current in the latter part of the half period in which it is generated. It was found that when operating a high pressure discharge lamp according to the Derra et al method and apparatus, flickering of the lamp can be substantially suppressed. However, this technique permits the arc gap to vary over an unacceptable range for some critical systems, such as the reflectors and optics described above.

SUMMARY

A method is disclosed for operating an electric discharge lamp having a pair of electrodes with an arc gap therebetween. The method includes the steps of applying a voltage and current to the electric lamp from a power supply, and providing a controller having means for sensing given parameters of lamp operation and means for generating a voltage and current to be applied by the power supply to the electric discharge lamp. The method further includes sensing the parameters of lamp operation such as lamp current and/or lamp voltage. The sensed parameters are compared with desired lamp parameters. The controller monitors the lamp parameters and in response commands the power supply to add a current pulse to a specific temporal portion of the lamp current waveform.

An apparatus for operating a discharge lamp having a pair of electrodes with an arc gap therebetween comprises a power supply for applying an operating voltage and current to the lamp electrodes and means for sensing the electric parameters of the discharge lamp. The apparatus also includes a controller responsive to the sensed electric parameters of the lamp for deriving an output control signal for the power supply. The controller includes means for comparing the sensed electric parameter with a corresponding desired parameter of the lamp. The power supply responds to the output control signal of the controller to adjust the lamp current so as to apply thereto a high-energy current pulse during a specific temporal portion of the lamp current waveform in a manner so as to compensate for any deviation of the lamp electric parameter from the corresponding desired parameter.

An important aspect of the invention is the recognition that the energy content of a narrow high-energy current pulse superimposed on the lamp current waveform exerts a significant influence over the length of the arc by control of the amplitude of the current pulse while monitoring the electrode voltage, which is a close analog of the length of the arc gap. The energy of the high-energy current pulse can be controlled by monitoring the length of the arc gap between the lamp electrodes by means of a microprocessor feedback loop, and in a manner so as to maintain substantially constant the length of the arc gap over a long time period. Another aspect of the invention is the discovery that the arc gap is very sensitive to the energy content of the high-energy current pulse, much more so than it is to the energy in the lamp current waveform.

As time goes on during the operation of the discharge lamp, it is usual for the length of the arc gap between the lamp electrodes to increase. The invention makes it possible it automatically adjust the high-energy current pulse so as to readjust the length of the arc gap to return it to its original length. If desired, the arc gap can, over time, be automatically adjusted to reduce the size of the arc gap below that of its original length. The opposite effect is also possible, i.e. to increase the length of the arc gap beyond its original length when the lamp was new.

Another feature of the invention is that one can describe the arc length as a function of the arc voltage and can store this function in the microprocessor controller.

This invention makes it possible to develop a discharge lamp ballast having a high narrow current pulse the amplitude of which can be adjusted automatically during operation of the discharge lamp. The pulse height (amplitude) of the narrow current pulse (high-energy pulse) can be adjusted according to an algorithm which keeps the arc voltage constant. For example, if the arc burns back the electrodes so as to increase the arc length and hence the arc voltage, then the height of the high-energy current pulse can be lowered, and if the arc voltage decreases (arc gap decreases), the pulse height can be increased so as to keep the arc voltage, and hence the arc gap, constant.

In a preferred embodiment, the sensing means includes sensing the arc gap, preferably by measuring the voltage across the arc gap, and adjusting the amplitude of the high-energy current pulse so as to keep the arc gap substantially constant.

It is an advantage of the method and apparatus that the arc length of the electric discharge lamp is maintained.

It is a further advantage of the method and apparatus that the collection efficiency of the overall system is maintained.

These and other advantages will become apparent in connection with the description to follow.

BRIEF DESCRIPTION OF THE DRAWINGS

Various embodiments of the subject method and lamp apparatus are explained in more detail with reference to the drawings (not true to scale), wherein.

DETAILED DESCRIPTION OF THE PREFERRED EMBODIMENTS

Figure 1:
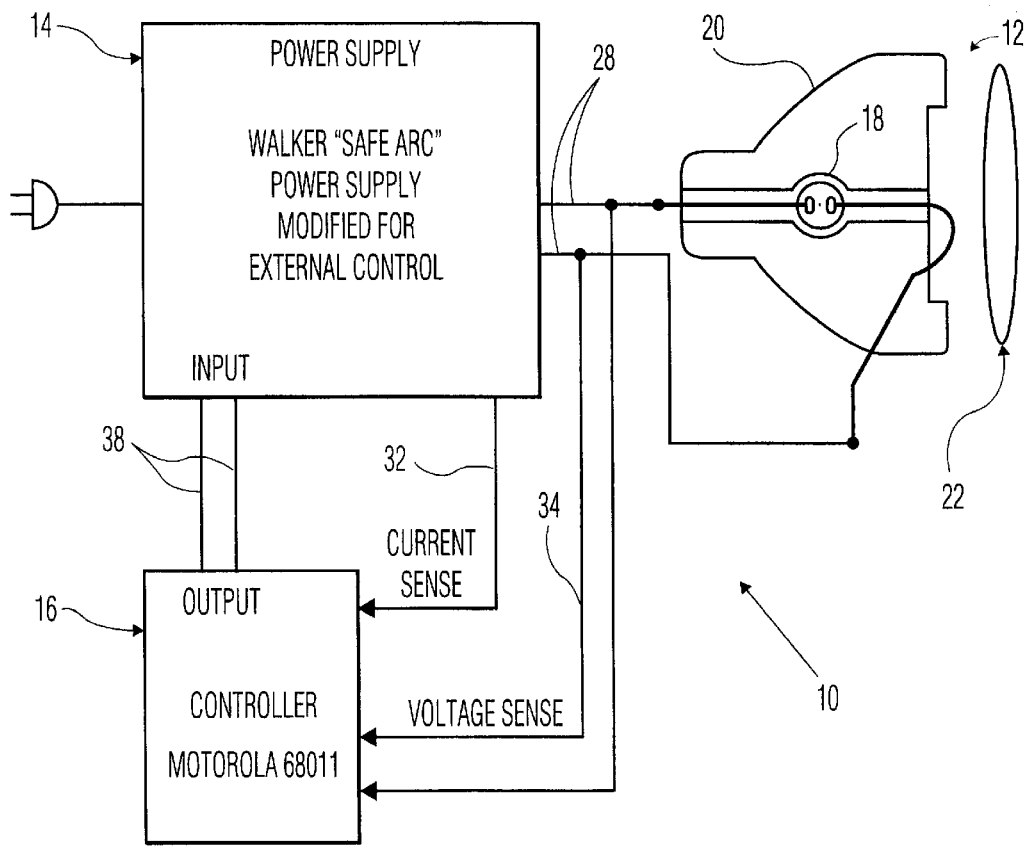
FIG. 1 is a block diagram of the system.

The preferred embodiment of the present invention will now be described in more detail with reference to the accompanying drawings. In this embodiment, the present invention is applied to a lighting system. The novel lighting system actively controls the lamp arc gap by means of a closed loop feedback control using a microprocessor controlled lamp driver that monitors the arc gap length as a function of the arc voltage. This information is processed by the microprocessor to derive the appropriate amplitude of the narrow high amplitude pulse and its proportion to the low amplitude long pulse of the lamp current waveform. The lighting system 10 includes a lamp unit 12, a lamp driver, or power supply 14, and a controller 16.

The lamp unit 12 used in the system 10 preferably includes a discharge lamp 18, reflector 20 and optics 22. Lamp 18 is preferably a short-arc, high intensity discharge lamp, for example, a CS 100W 2 lamp manufactured by Philips Electronics, the specifications of which are incorporated by reference herein. Lamp 18 is typically provided with a sealed quartz glass envelope and filled with an ionizable filling of primarily mercury and small amounts of iodides and rare earth metals. Lamp 18 has a pair of tungsten (W) electrodes 24 defining a small arc gap 26 therebetween, typically in the range of 1 mm to 1.4 mm. Lamp 18 is an AC-driven lamp, such that the heat load is shared by both electrodes. The power supply typically supplies a square wave AC to power the lamp.

Figure 2:
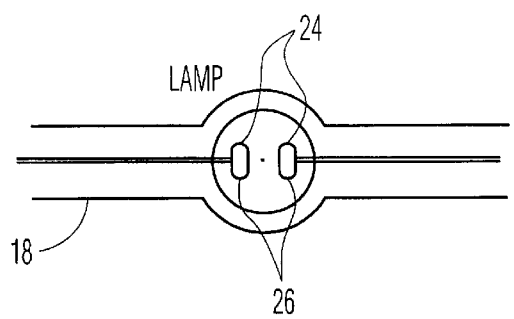
FIG. 2 is a side elevation of a conventional arc lamp for use in the system of FIG. 1, illustrating the electrode configuration and arc gap.

The lamp 18 is used in conjunction with a precision reflector 20 as described above. Reflector 20 is designed to produce maximum collection efficiency, and therefore requires that there be very little displacement of the arc 26 (FIG. 2) during operation. Such movement of the arc can result in significant losses in light output. In addition, lamp unit 12 is provided with additional optical elements 22 to optimize the light output into, e.g. a collimated output. The small arc and the optical system make it possible to focus a narrow high intensity light beam on to a small area, such as an element of a liquid crystal display (LCD) device.

Voltage and current are supplied to the lamp unit 12 by means of the power supply 14. Preferably, power supply 14 is a Walker "Safe Arc" power supply that supplies power (voltage and current) to the electrodes 24 of the lamp 18 via connection leads 28. Lamp current is sensed in the power supply (14) and is applied to current sensor input terminals of the microprocessor controller 16 via connection line 32. The lamp electrode voltage is applied to voltage sense input terminals of the controller 16 via connection lines 34.

The controller 16 can be a 68011 Motorola microprocessor which receives the arc voltage and supplies it to the microprocessor for processing. The controller processes the arc voltage and lamp current information and supplies via output control lines 38 a control signal by which the power supply 14 adjusts the height (amplitude) of the narrow high-energy current pulse so as to maintain the length of the arc gap 26 constant over time. The controller can include a look-up table that relates arc voltage to the current level of the high-energy stabilization current pulse 40 (FIG. 3).

Figure 3:
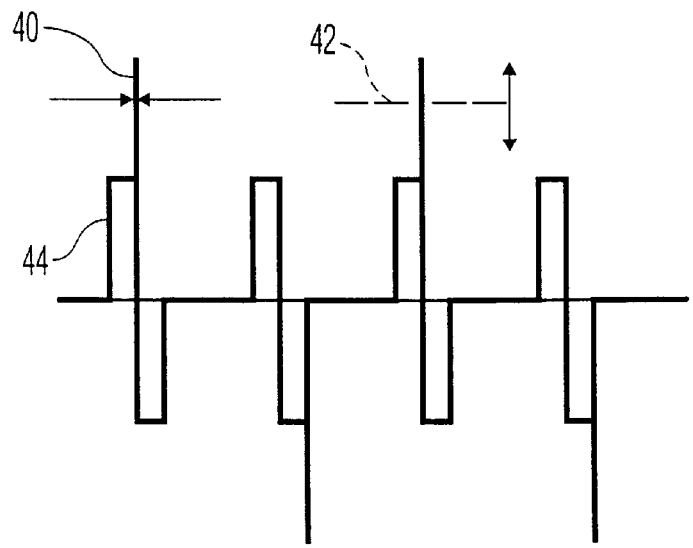
FIG. 3 is a diagram showing the lamp current waveform as a function of time.

FIG. 3 shows the lamp current waveform as a function of time. The dashed line 42 indicates the level of the high-energy current pulse 40 for rated lamp power and the arrow heads indicate adjustment of the height of the pulse 40 in order to maintain the arc gap constant. This is achieved by means of the feedback control provided by the controller 16 which monitors the length of the arc gap 26 by measuring the arc voltage, the latter being a function of the arc gap. As the arc gap starts to increase, the measured arc voltage also increases and the controller responds to produce a control signal for the power supply 14 that orders it to readjust the height of energy pulse 40 for a controlled period of time so as to bring the arc gap back to its original size. If the arc gap tends to decrease, the opposite effect is produced by the active feedback control. Thus, the controller monitors the arc gap length as a function of the arc voltage, processes this information and orders the power supply to adjust the amplitude of the short high amplitude pulse 40 and thereby its proportion to the lower amplitude pulse 44. Thus, if the arc burns back the electrodes to increase the arc gap and thus the arc voltage, the controller and power supply lower the height of stabilization pulse 40 so as to keep the arc voltage and hence the arc gap constant.

In FIG. 3, the short duration pulse 40 is present in alternate positive and negative half periods of the lamp current, but of course they can be present and adjusted in consecutive half periods. The current pulses 40 also can be generated in a periodic manner, for example in every third, every fifth etc., half period of lamp current, or in bursts.

Figure 4:
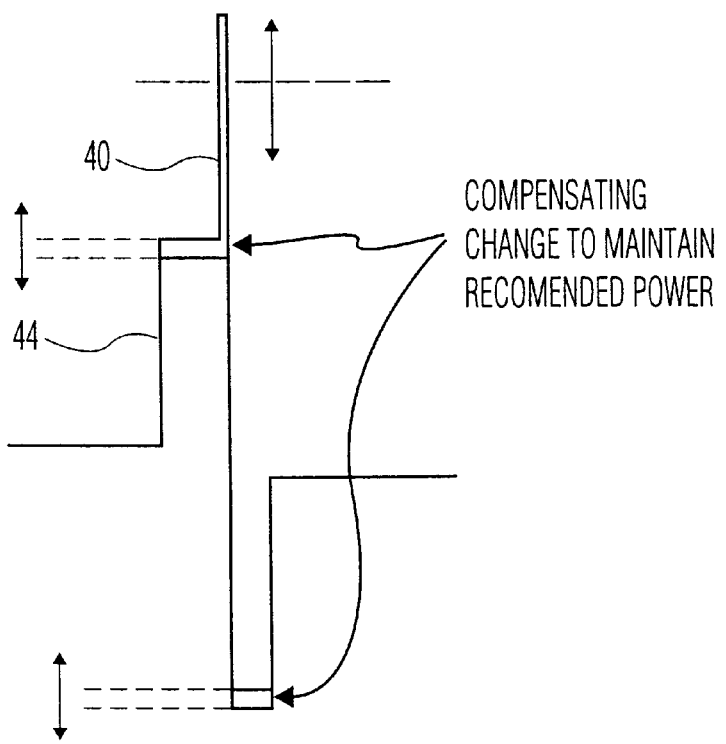
FIG. 4 is another diagram showing the lamp current waveform as a function of time.

FIG. 4 shows an alternate feature of the invention whereby the controller can adjust the amplitude of the low amplitude current pulse 44 as well as the amplitude of the stabilization current pulse 40. The pulse 44 is adjusted to increase or decrease in proportion to a change in the pulse 40 thereby to keep the power constant while controlling the temporal energy distribution of the lamp drive. The invention thus permits a greatly improved control of both arc length and position.

It will be understood that various modifications may be made to the embodiments shown herein. Therefore, the above description should not be construed as limiting, but merely as exemplifications of the preferred embodiments. Those skilled in the art will envision other modifications within the scope and spirit of the claims appended hereto.

What is claimed is:

1. An apparatus for operating an electric discharge lamp having a pair of electrodes with an arc gap therebetween, comprising:
    a power supply for applying operating voltage and current to the pair of electrodes of the electric discharge lamp,
    means for sensing at least one electric parameter of the electric discharge lamp, and
    a controller responsive to the at least one sensed electric parameter of the discharge lamp for deriving an output control signal to be applied to the power supply, the controller including means for comparing the at least one sensed electric parameter with a corresponding desired parameter of the discharge lamp, and wherein
    the power supply, in response to said output control signal of the controller, adjusts the lamp current so as to apply thereto a high-energy current pulse during a specific temporal portion of the lamp current waveform thereby to compensate for any deviation of the at least one electric parameter from the corresponding desired parameter of the discharge lamp.

2. The discharge lamp apparatus as claimed in claim 1 wherein the at least one electric parameter of the discharge lamp that is sensed is the electrode arc voltage, and wherein;
    the means for sensing senses the discharge lamp current,
    the controller is responsive to an output signal of the lamp current sensing means so as to modify its output control signal, and
    the power supply, in response to the modified control signal of the controller, adjusts the high-energy pulse in a manner so as to regulate the power of the discharge lamp.

3. The discharge lamp apparatus as claimed in claim 1 wherein the at least one electric parameter of the discharge lamp that is sensed is the electrode arc voltage, and wherein
    the controller is responsive to a signal representing the discharge lamp arc voltage so as to modify its output control signal, and
    the power supply, in response to the modified control signal of the controller, adjusts the amplitude of the high-energy current pulse so as to maintain the length of the electrode arc gap constant.

4. The discharge lamp apparatus as claimed in claim 1 wherein the at least one electric parameter of the discharge lamp that is sensed is the electrode arc voltage, and wherein
    the controller is responsive to a signal representing the discharge lamp arc voltage so as to modify its output control signal, and
    the power supply, in response to the modified control signal of the controller, adjusts the amplitude of the high-energy current pulse so that when the arc voltage increases, the amplitude of the high-energy current pulse decreases, and vice versa, thereby to maintain the arc voltage constant.

5. The discharge lamp apparatus as claimed in claim 1 wherein the at least one electric parameter of the discharge lamp that is sensed is the electrode arc voltage, wherein
    the power supply supplies an AC current waveform to the lamp electrodes composed of a relatively wide rectangular current pulse with a narrow high-energy current pulse superimposed thereon, and
    the output control signal of the controller commands the power supply to adjust the amplitude of the wide rectangular current pulse as a function of a change in amplitude of the narrow high-energy current pulse in a manner so as to keep the lamp power constant.

6. The discharge lamp apparatus as claimed in claim 2 wherein the at least one electric parameter of the discharge lamp that is sensed is the electrode arc voltage, and wherein the controller comprises a microprocessor which includes a look-up table storing data defining the relationship between the arc voltage and lamp current.

7. The discharge lamp apparatus as claimed in claim 1 wherein the power supply generates an alternating current waveform with a high-energy current pulse of the same polarity superimposed on the latter part of the lamp current period in which it is generated.

8. The discharge lamp apparatus as claimed in claim 7 wherein the power supply generates the high-energy current pulse in each half period of the lamp current 9. The discharge lamp apparatus as claimed in claim 7 wherein the power supply generates high-energy current pulses in non-successive half periods of the alternating lamp current.

10. The discharge lamp apparatus as claimed in claim 1 wherein the power supply, in response to said output control signal of the controller, adjusts the energy content of the high-energy current pulse in a manner so as to provide said compensation for any deviation of the at least one electric parameter from the corresponding desired parameter of the discharge lamp.

11. The discharge lamp apparatus as claimed in claim 10 wherein the power supply adds the high-energy current pulse to the lamp operating current.

12. The discharge lamp apparatus as claimed in claim 1 wherein the controller is responsive to the at least one sensed electric parameter so as to modify its output control signal based upon any deviation of the at least one electric parameter from the corresponding desired parameter of the discharge lamp, and
    the power supply, in response to the modified control signal of the controller, adjusts the high-energy pulse in a predetermined manner related to optimization of the operation of the discharge lamp.

13. The discharge lamp apparatus as claimed in claim 1 wherein the discharge lamp comprises a high intensity discharge lamp and the high-energy current pulse has the same polarity as the lamp operating current.

14. The discharge lamp apparatus as claimed in claim 1 wherein the high-energy current pulse is superimposed on the lamp operating current only in a latter part of a half period of the lamp operating current.

15. A method for operating an electric discharge lamp having a pair of electrodes with an arc gap therebetween, comprising:

applying a voltage and current to the electric discharge lamp from a power supply, sensing particular parameters of lamp operation;

comparing the sensed parameters with desired lamp parameters; and compensating for changes in the particular lamp parameters, based upon the comparing step, by configuring the lamp current so as to apply a current pulse to a specific temporal portion of the lamp current.

16. A method for operating an electric discharge lamp having a pair of electrodes with an arc gap therebetween, comprising:

applying a voltage and a current to the lamp electrodes from a power supply, sensing at least one parameter of lamp operation, comparing the at least one sensed lamp parameter to a corresponding desired lamp parameter, generating a narrow high-energy current pulse which is superimposed on the lamp current waveform at a specific temporal portion of the lamp current waveform, and based upon the result of the comparing step, adjusting the energy content of the high-energy current pulse.

17. The discharge lamp operating method of claim 16 wherein the at least one electric parameter of the discharge lamp that is sensed is the electrode arc voltage, wherein the power supply supplies an alternating lamp current to the lamp electrodes, and the adjusting step comprises adjusting the amplitude of the narrow high-energy current pulse so as to maintain the arc voltage constant.

18. The discharge lamp operating method of claim 17 wherein the narrow high-energy current pulse has the same polarity as the alternating lamp current.

19. The discharge lamp operating method of claim 17 which comprises generating said high-energy current pulse in at least alternate half periods of the alternating lamp current waveform.

20. The discharge lamp operating method of claim 17 which comprises generating said high-energy current pulse in less than every half period occurring over a given time interval.

* * * * *